2,771,138

WATERFLOODING METHOD OF SECONDARY RECOVERY

Donald M. Beeson, Tulsa, Okla., assignor to Esso Research and Engineering Company, a corporation of Delaware No Drawing. Application June 13, 1955,
Serial No. 515,264

9 Claims. (Cl. 166—9)

The present invention broadly concerns a secondary recovery procedure for obtaining oil from subterranean reservoirs. The invention more particularly relates to a secondary recovery procedure wherein water is employed as the driving medium. The invention especially concerns an improved type of water-flooding process in which fingering and oil reservoir bypassing on the part of the water is greatly reduced.

The use of secondary recovery procedures for removing oil from subterranean oil reservoirs is well known in the petroleum industry. It is the function of such procedures to make possible the recovery of oil from reservoirs that have ceased primary production. In general, all secondary recovery procedures employ a driving medium such as a liquid or gas for displacing additional oil from a reservoir. The displacing medium, usually a fluid, is injected in a reservoir as by means of one or more of the original wells or by means of entirely new wells; and the oil in the reservoir is displaced toward and withdrawn from other remaining wells.

Due partially to its ready availability in many regions, water has been extensively employed as a driving medium in secondary oil recovery programs. This medium, however, has been found to possess several serious shortcomings. One particularly noteworthy shortcoming lies in the fact that a water drive frequently "fingers" and tends to bypass substantial portions of an oil reservoir. It is known that oil reservoirs possess regions and strata of different permeabilities; and apparently the water flows much more rapidly through some reservoir flow paths than it does through others. The net result of this occurence is that water flooding often completely misses substantial portions of a reservoir.

At this point it is well to note that oil reservoir fluids and crude oils vary greatly in viscosity—some being as low as 1 or 2 cps. and some ranging up to 1000 cps. or even more. It is also well known that water flooding as well as other secondary recovery procedures perform less satisfactorily with viscous crude oils and reservoir fluids than with relatively non-viscous crude oils and reservoir fluids.

Accordingly, several procedures have been suggested to date for improving the mechanics of waterflooding procedures, particularly with a view to reducing the degree of fingering and bypassing. One suggestion has been to increase the viscosity of the water drive relative to the oil (i. e., the water/oil viscosity ratio) by incorporating water soluble viscous agents within the water. Materials that have been suggested for this purpose include a wide variety of naturally occurring gums and polymers. These materials, however, have been observed to be somewhat unstable and to form products that clog the pores of oil reservoirs. Accordingly, these materials tend to greatly increase the resistance to flow of fluids within these reservoirs and to thereby hamper a flooding program.

It has also been suggested to employ aqueous solutions of certain synthetic polymers such as the copolymers of methyl vinyl ether and maleic anhydride, the condensation products of fatty acids and hydroxyamines, sodium polyacrylate, polyacrylic acid, sodium polymethacrylate, etc. All of these solutions are characterized by viscosities that are greater than that of water and accordingly would be more attractive than water as flooding media. With regard to these types of aqueous solutions, however, it has been observed that their viscosities are greatly decreased when they come in contact with brines such as are customarily present within oil reservoirs. Apparently, the electrolytes that are present within the brines in some way destroy the cross-linkages or other viscosity contributing characteristics that the polymers possess with the result that the viscosity of a solution containing them is markedly decreased.

It has still further been suggested that sucrose and crude sugars be employed in aqueous solutions as water flooding media. With respect to sucrose, however, solutions containing this material are ordinarily prohibitively expensive for secondary recovery use and their use is substantially impracticable. With respect to crude sugars it has been found that aqueous solutions of these materials vary markedly in their viscosity characteristics with temperature. Specifically, it has been established that the viscosity of an aqueous crude sugar solution decreases very greatly and undesirably with increasing temperature. Since reservoir temperatures are generally within the range from about 60° F. to 250° F., this factor becomes an extremely important one. It is particularly apparent that it would be eminently desirable to increase the viscosity of a crude sugar solution and/or render it more stable with respect to temperature.

Accordingly, it is an objective of this invention to provide an improved waterflooding secondary recovery procedure wherein fingering and reservoir bypassing are markedly reduced. It is further an objective of the invention to improve upon waterflooding secondary recovery procedures, particularly when they are applied to reservoirs containing relatively viscous crude oils and reservoir fluids. More specifically, it is an objective of the invention to provide a waterflooding procedure which utilizes a bank of an aqueous sugar solution between the oil within the reservoir and the water drive. Expressed otherwise, the invention relates to a secondary recovery procedure wherein an aqueous sugar solution is injected at one or more points within an oil reservoir to be followed by the injection of a water drive. The invention especially has as an objective a procedure in which a bank of an aqueous molasses solution is first injected into a reservoir and then followed by a waterflood. The oil that is displaced by this procedure is withdrawn from the reservoir by means of producing wells that are at spaced points within the reservoir from the injection wells.

These and related objectives are attained in accordance with the present invention by a secondary recovery procedure in which an oil-displacing fluid in the form of an aqueous sugar solution containing dissolved amounts of particular metal salts is injected as a bank into a subterranean oil reservoir followed by a conventional waterflood. More particularly, the objectives are attained by a procedure in which the sugar solution is one wherein the sugar component consists primarily of a disaccharide and the metal salt is a water-soluble salt of a metal selected from the class consisting of lithium, beryllium and aluminum. The solution is further particularly characterized by possessing critical viscosity characteristics relative to the oil in the reservoir and is still further characterized by the amounts of the solution that are injected within the reservoir.

Referring first to the sugars that are employed in the practice of this invention, it is contemplated that a large number of sugars are suitable such as the monosaccharides including dextrose, levulose, etc.; the disaccharides including sucrose, raffinose, maltose, etc.; and mixtures of these various saccharides such as occur in crude sugars and particularly in molasses. Indeed, molasses has been found to be a particularly attractive and effective material for use in the practice of the invention.

As is well known in the art, molasses is a syrup derived in the crystallization of sugar from the aqueous extracts that are in turn derived from sugar cane and sugar beets. The composition of molasses varies somewhat depending upon the origin of the crude sugar as well as the type of refining process involved, but it generally contains about 45 to 50 percent sucrose along with varying amounts of dextrose, levulose, raffinose, and the like.

The metal salts that are employed in the carbohydrate solutions of the invention include the water soluble salts of aluminum, lithium and beryllium. All of these metals are generally characterized by possessing relatively large ratios of electrical charge to ionic radius, and it appears that this characteristic of these metals is in some way responsible for the success of the invention. Suitable salts of the above metals include the sulfates, chlorides, bromides, nitrates, nitrites, phosphates, etc. of lithium, aluminum and beryllium. Particularly preferred salts are the following: aluminum sulfate, lithium sulfate, beryllium sulfate, aluminum chloride and lithium chloride. A particularly preferred metal salt for the purposes of the invention is $Al_2(SO_4)_3 \cdot 18H_2O$ which has proven to be markedly effective.

In choosing the best sugar-salt solution for use in any given reservoir recovery program, it will be appreciated that due consideration must be given to the physical properties of the oil in the reservoir as well as to conditions within the reservoir such as its temperature and the like. One very important factor in determining the nature of the solution is the viscosity of the oil in the reservoir, since it is preferred that the viscosity ratio of the oil to the viscous sugar solution be from about 1/1 to 10/1. It is particularly preferred that this ratio be from about 1/1 to 5/1 and especially about 1/1.

Thus, the composition of the aqueous sugar-salt solution is governed at least partially by the viscosity ratios just stated. The composition of the solution is further governed by the requirement that the solution have a viscosity of less than 500 centipoises and preferably less than 100 centipoises.

The temperature of the reservoir forms still an additional important factor in the choice of the aqueous sugar-salt solution in that it has been found that the viscosity of these solutions decreases in some instances quite measurably with increasing temperature. In the absence of the aforementioned metal salts, the decreases in viscosity with temperature are so great that economically prohibitive and impractical amounts of sugar would be necessary to prepare the solutions which would possess the desired viscosity at the reservoir temperature. This condition is particularly true for molasses solutions, which as mentioned earlier constitute particularly preferred solutions for the practice of the invention.

Insofar as the concentration of the metal salt in the sugar solution is concerned, it is desirable that the amount be sufficient to provide the solution with the desired viscosity-temperature characteristics. Expressed otherwise, it is desirable that a given sugar-salt solution have a minimum viscosity within the reservoir but that it also not possess an undesirably high viscosity under the temperature conditions that prevail at the earth's surface and in the conduits leading to the reservoir. Specifically, it is necessary that the solution be characterized by a viscosity meeting the requirements mentioned earlier but preferably without exceeding a value of about 500 centipoises and preferably 100 centipoises under atmospheric conditions.

With these requirements in mind it is contemplated that about 5 up to about 50 weight percent of the above listed salts be employed in any given aqueous solution. Aqueous black strap molasses solutions containing dissolved $Al_2(SO_4)_3 \cdot 18H_2O$ have been found to be extremely well adapted for the practice of this invention.

In applying the invention to an actual secondary recovery process it is contemplated that about 0.05 to 0.5 hydrocarbon pore volume of a sugar-salt solution be first injected into the reservoir to be followed by a conventional waterflood. It is particularly contemplated that about 0.1 hydrocarbon volume of the solution be used in most instances.

In carrying out the method of the invention, the reservoir is provided and prepared in a conventional manner with the desired number of injection wells and producing wells. The procedure is equally adaptable to line drive flooding techniques as well as to techniques that employ five-spot patterns and the like.

Having prepared the desired number of wells, a bank of the sugar-salt solution is introduced into an oil reservoir through the injection wells until the desired hydrocarbon volume of solution has been incorporated within the reservoir. Generally speaking, it is desired that the rate of injection be such that the solution advances as an integral bank through the reservoir at conventional waterflooding rates. Once the viscous solution has thus been injected, flooding water in the form of fresh water or the like is then injected as in a conventional waterflood program. The water flood is continued until as much oil as is feasible has been withdrawn from the reservoir. At this point it will be noted that the fluids that are produced at the production wells will generally consist first of oil followed by the bank of sugar-salt solution and finally by the waterflood itself. Thus, the sugar-salt solution throughout the procedure remains substantially as a bank or band lying between the oil in the reservoir and the water drive.

It will be appreciated that a number of variations in this procedure may be employed without departing from the spirit or scope of the invention. Thus, it is contemplated that at least a portion of the viscous solution bank may be withdrawn from the reservoir at various points and recycled or returned to the bank at prior points in the reservoir. It is also contemplated that other agents such as compounds adapted to inhibit fermentation of the solution may be employed. Furthermore it is noted that the viscous solution may be employed as the sole driving medium without the use of a following water drive, but this procedure is not preferred. The cost of the flooding solution and its relatively high viscosity make any such program less attractive than the procedure employing a bank of the solution in combination with a water drive.

The invention as described above may be even better understood and illustrated by the following examples.

EXAMPLE 1

A number of different solutions were prepared containing aluminum sulphate alone, sucrose alone, and sucrose and aluminum sulphate in combination. Having prepared the solutions, viscosity determinations were made on the solutions at about 75° F. The compositions and viscosities of the solutions are presented in the following table.

Table I

| Aqueous Solution Containing— | Viscosity, cps |
|---|---|
| 47% Sucrose | 11 |
| 40% Sucrose, 13% $Al_2(SO_4)_3 \cdot 18H_2O$ | 14 |
| 38% Sucrose, 17% $Al_2(SO_4)_3 \cdot 18H_2O$ | 30 |
| 37% Sucrose, 21% $Al_2(SO_4)_3 \cdot 18H_2O$ | 42 |
| 35% Sucrose, 25% $Al_2(SO_4)_3 \cdot 18H_2O$ | 50 |
| 13% $Al_2(SO_4)_3 \cdot 18H_2O$ | 5 |
| 17% $Al_2(SO_4)_3 \cdot 18H_2O$ | 8 |
| 20% $Al_2(SO_4)_3 \cdot 18H_2O$ | 10 |

It is apparent from the above data that metal salts such as aluminum sulphate are markedly effective in increasing the viscosity of an aqueous sucrose solution. For example, it will be observed that a solution containing 38 weight percent sucrose and 17 weight percent of the aluminum sulphate hydrate possesses a viscosity of 30 centipoises while a 47 weight percent sucrose solution has a viscosity of 11 centipoises and a 17 weight percent salt solution has a viscosity of 8 centipoises. Thus, the solution containing the combined solutes has a viscosity far greater than would be expected on a merely additive basis. From this fact it follows that a reservoir flooding program utilizing a solution of the combined solutes may be employed in markedly greater dilutions than a solution of either solute alone.

EXAMPLE 2

A sample of blackstrap molasses having a viscosity of about 30 cps. at 79° F. was subjected to viscosity determinations at progressively greater temperatures. The salt $Al_2SO_4 \cdot 18H_2O$ to the extent of about 14 weight percent (based on the molasses) was then dissolved in the molasses and the viscosity of the resulting solution adjusted to about 30 cps. at 79° F. by the addition of more water. Changes in the viscosity of the solution with increasing temperature were then again determined. From the data obtained in this manner the following comparisons were possible.

| Solution Temp., ° F. | Viscosity, Percent of Viscosity @ 79° F. | |
| --- | --- | --- |
| | Molasses | Molasses + $Al_2(SO_4)_3$ |
| 79 | 100 | 100 |
| 84 | 74 | 96 |
| 92 | 61 | 93 |

It is apparent from these results that the sugar-salt solutions of the present invention possess markedly improved viscosity-temperature relationships in comparison with sugar solutions alone. This characteristic is particularly desirable, since it means that a sugar-salt solution made up at atmospheric temperature at the earth's surface will not suffer extreme losses in viscosity upon being injected into a reservoir that has a temperature in excess of the atmospheric temperature. Expressed otherwise, it means that the sugar-salt solution as prepared at the earth's surface would be characterized by a much lower viscosity than a sugar solution which would have the same viscosity as the sugar-salt solution at an elevated temperature.

In summary, then, the invention makes possible a simple but effective means for improving a water flooding secondary recovery procedure by interposing a bank of a relatively viscous aqueous sugar-salt solution between the water drive and the oil in a reservoir. The procedure is furthermore unique and valuable in that the viscous solution possesses a relatively stable viscosity with changes in temperature and requires much less sugar to reach any given viscosity level than does a solution containing either sugar or salt alone. The advantages flowing from the use of the process include increased oil recovery and less reservoir bypassing.

What is claimed is:

1. A method of recovering oil from a subterranean oil reservoir which comprises injecting an aqueous solution within the reservoir, the aqueous solution containing dissolved sugar and a water-soluble salt of a metal selected from the class consisting of aluminum, lithium and beryllium, the amounts of sugar and salt within the solution being sufficient to provide the solution with a viscosity of from 0.1 to one times the viscosity of the oil but less than 500 centipoises, the amount of the aqueous solution injected constituting from about 0.05 to 0.5 the volume of hydrocarbon within the reservoir, thereafter injecting water into the reservoir so as to drive the aqueous solution through the reservoir in the form of a bank, and withdrawing fluids including oil from the reservoir at a point removed from the point of injection.

2. A method as defined in claim 1 in which the aqueous solution has a viscosity less than 100 centipoises.

3. A method as defined in claim 1 in which the viscosity of the aqueous solution is from 1/5 to one times the viscosity of the oil.

4. A method as defined in claim 1 in which the aqueous solution has a viscosity about equal to that of the oil.

5. A method as defined in claim 1 in which the aqueous solution contains from 5 up to about 50 weight percent of said salt.

6. A method of recovering oil from a subterranean oil reservoir which is pierced by at least one injection well and one production well, which comprises the steps of injecting a viscous aqueous solution through the injection well into the reservoir to form a pool in the immediate vicinity of the injection well, the aqueous solution containing dissolved sugar and a water-soluble salt of a metal selected from the class consisting of aluminum, lithium and beryllium, the aqueous solution having a viscosity of about 0.1 to one times the viscosity of the oil and constituting about 0.05 to 0.5 the volume of the oil, thereafter injecting water through the injection well so as to drive the aqueous solution in the form of a bank toward the production well, and withdrawing fluids including oil from the production well.

7. A method as defined in claim 6 in which the salt is a water-soluble salt of aluminum.

8. A method as defined in claim 6 in which the sugar is a crude sugar.

9. A method as defined in claim 6 in which the sugar is molasses.

References Cited in the file of this patent

UNITED STATES PATENTS

| 2,341,500 | Detling | Feb. 8, 1944 |
| 2,645,291 | Voorhees | July 14, 1953 |